United States Patent [19]

Hilfman

[11] 3,933,683

[45] Jan. 20, 1976

[54] PRETREATMENT OF CATALYST EMPLOYED IN THE HYDROGENATION OF HYDROCARBONS

[75] Inventor: Lee Hilfman, Arlington Heights, Ill.

[73] Assignee: Universal Oil Products Company, Des Plaines, Ill.

[22] Filed: Nov. 23, 1973

[21] Appl. No.: 418,700

[52] U.S. Cl................................. 252/439; 208/215
[51] Int. Cl.²........................................... B01J 27/04
[58] Field of Search...................... 252/439; 208/215

[56] References Cited
UNITED STATES PATENTS

| 3,155,739 | 11/1964 | Fleming | 252/439 X |
| 3,444,074 | 5/1969 | Yan | 252/439 X |
| 3,554,902 | 1/1971 | Buss | 252/439 X |
| 3,617,520 | 11/1971 | Kluksdahl | 252/439 X |
| 3,821,123 | 6/1974 | Germanas et al. | 252/439 |

*Primary Examiner*—Patrick P. Garvin
*Attorney, Agent, or Firm*—James R. Hoatson, Jr.; Thomas K. McBride; William H. Page, II

[57] ABSTRACT

A hydrogenation catalyst in an oxidized state is activated by a method which yields a superior performing hydrogenation catalyst. The hydrogenation catalyst is reduced, sulfided and stripped by a procedure which allows a more economical and time-saving start-up procedure.

3 Claims, No Drawings

PRETREATMENT OF CATALYST EMPLOYED IN THE HYDROGENATION OF HYDROCARBONS

This invention relates to the field of art commonly referred to as catalyst pretreatment or catalyst activation. More particularly, this invention relates to a method of activation of an amorphous or crystalline hydrogenation catalyst through the use of a reduction, sulfiding and stripping procedure. More particularly, this invention relates to a method of reduction and sulfiding of a hydrogenation catalyst contained in a hydrogenation reaction zone by the reduction and sulfiding of the hydrogenation catalyst in the presence of a gaseous stream comprising hydrogen and a normally gaseous sulfide and by the hydrogen stripping thereof followed by the subsequent adjustment of the catalyst temperature to promote hydrocarbon hydrogenation reactions. This procedure allows integrated start-up and linedout operations to be performed in the hydrogenation reaction zone.

As a general rule, most hydrogenation catalysts that contain ion-exchanged or impregnated metallic components are utilized in a reduced and sulfided state within commercial hydrogenation reaction zones. Commercial hydrogenation catalysts are generally reduced and sulfided prior to the introduction of hydrocarbon feed stock in order to stabilize the hydrogenation catalyst by reducing the catalyst's initial high activity. The reduction and sulfiding in most cases eliminates the possibility of extreme temperature runaways which create high temperature conditions in the hydrogenation catalyst reaction zone which can cause permanent injury to both the hydrogenation catalyst and the reaction vessel.

In the commercial preparation of hydrogenation catalysts, reduction and sulfiding of the catalyst is generally performed under controlled conditions by contacting the freshly oxidized catalyst with a distillate petroleum stock and preferably with a cycle oil or a gas oil. In the case of a unit designed to process hydrocarbon distillate, the actual feed stock, e.g., naphtha, kerosene, gas oil, etc., may often be suitably employed for the reduction and sulfiding of the catalyst. However, in processing units designed for the treatment of what is commonly referred to as black oils which are characterized by having a significant portion boiling above 1,050°F., the feed stock is not usually suitable for the pretreatment of fresh catalyst and a cycle oil or a gas oil is normally utilized.

Those familiar with the commissioning of a new batch of catalyst in a black oil hydrogenation processing unit will appreciate the attendant burden of reducing and sulfiding the new catalyst. Since many black oil units have a daily design capacity of from about 20,000 to about 50,000 barrels, a million or more pounds of catalyst must be treated. By the magnitude of the operation, it is easily seen that a very large quantity of start-up oil must be accumulated and stored. The start-up oil is usually a selected boiling range stock which must be fractionated during the refinery's normal operation and since often only a few thousand gallons of the selected stock may be collected each day, considerable time may be required to produce a sufficient quantity for the catalyst pretreatment. For the very large units, a million or more gallons may be required and which must be stored in a convenient location. Not only must special storage facilities be supplied, but high capacity transfer pumps and piping which are used perhaps a few weeks each year are also required. The actual step of pretreating the catalyst can be quite time consuming, lasting for several days and during which time production is lost.

The above-mentioned tedious and time-consuming routine which must be performed on each batch of fresh catalyst has provided the incentive to seek a more facile method of reducing and sulfiding hydrogenation catalyst. A considerable amount of work has been performed in the past relating to pretreating catalysts with hydrogen and hydrogen sulfide and with little or no success.

I have found that through the use of the method of activation of my invention that a hydrogenation catalyst may be as effectively pretreated as when conventional techniques are employed without any of the hereinabove described disadvantages. In using the process of my invention for the activation of a hydrogenation catalyst, there is no need to supply special hydrocarbon storage facilities, pumps and other related hardware, and the actual pretreatment feed stocks. Furthermore, the time required to perform the pretreatment step is greatly reduced by the techniques of the present invention.

It is an object of the present invention to activate and oxidized hydrogenation catalyst by reduction and sulfiding steps which give an activated hydrogenation catalyst having superior activity. It is another object of the present invention to reduce and sulfide a hydrogenation catalyst by a method which precludes the necessity of contacting the catalyst with a special start-up or pretreatment oil. It is yet another object of the present invention to eliminate the need for pretreatment oil storage and pumping facilities.

More specifically, another object of the present invention is a method for the activation of a mass of a hydrogenation catalyst containing at least one metallic component present in an oxidized form, which method comprises the steps of: (a) intimately contacting said mass of catalyst with gaseous hydrogen, containing a sulfur compound, at a temperature within the range of from about 550°F. to about 800°F. for a sufficient time to effect the reduction and sulfiding of a major proportion of said metallic component; and, (b) stripping the resulting reduced and sulfided catalyst with substantially pure hydrogen at a temperature within the range of from about 750°F. to about 900°F.

The process of this invention relates to the activation of a hydrogenation catalyst which is in an oxidized state. In referring to the oxidized state of a hydrogenation catalyst, the art generally refers to the oxidized hydrogenating components of the catalyst which are generally selected from the Group VIII metals of the Periodic Table of the Elements and include iron, cobalt, nickel, ruthenium, rhodium, palladium, osmium, iridium and platinum. When referring to an oxidized hydrogenation catalyst in this specification, I refer to the hydrogenating metal components of the catalyst recited hereinabove that are substantially in the oxidized state.

In order to initiate hydrogenation catalyst reaction systems without adversely harming the catalyst activity, it is preferred to begin hydrogenation operations with substantially all of the metallic hydrogenation components of the catalyst in a sulfided state. Sulfiding reduces the initial high activity associated the catalysts containing Group VIII metals, thereby reducing production of excess dry gaseous material while maintaining catalyst stability.

The metallic components are generally deposited on an inorganic oxide base or carrier material. Suitable carrier materials are the silica aluminas, the crystalline aluminosilicates and alumina. the amorphous carrier material may be prepared in any suitable manner, one method being to commingle water glass and a mineral acid, such as hydrochloric acids, sulfuric acid, etc., under conditions to precipitate a silica hydrogel. A silica hydrogel is than allowed to age after the pH has been adjusted to a proper level to allow the silica to at least partially polymerize. Following the aging of the silica gel, the pH is then raised by the addition of a basic substance, such as ammonium hydroxide, sodium hydroxide, etc., to neutralize acid present in the contacting of acid and water glass. Following this, aluminum in the form of an aluminum sulfate, aluminum chloride, aluminum nitrate, etc., is added to the silica gel. A silica alumina hydrogel is precipitated and treated by washing, filtering, reslurrying, spray drying and calcination in the usual manner. The active metallic component of the catalyst is then composited with the carrier material generally in an amount from about 0.01% to about 20% by weight of the finished catalyst.

The aforementioned desirable metal components to be incorporated into the catalyst comprise the Group VIII metals and may be incorporated into the catalyst base in any suitable manner. One such manner is to composite the metal component with the catalyst base by forming an aqueous solution of the halide of the metals such as platinum chloride, palladium chloride, etc., further diluting the solution and adding the resultant diluted solution to the base in a steam drier. Other suitable metal solutions may be employed such as colloidal solutions or suspensions, including the desirable metals cyanides, metal hydroxides, metal oxides, metal sulfides, etc. In cases where these solutions are not soluble in water at the temperature used, other suitable solvents, such as alcohols, ethers, etc., may be utilized.

Both the natural and synthetic zeolitic aluminosilicates may be activated by the present invention. A crystalline zeolitic aluminosilicate encompassed by the present invention includes aluminosilicate cage structures in which the alumina and the silica tetrahedra are intimately connected with each other in an open three-dimensional crystalline network. The tetrahedra are crosslinked by the sharing of oxygen atoms. The spaces between the tetrahedra are occupied by water molecules prior to dehydration. The dehydration results in crystals interlaced with channels of molecular dimensions. Thus, the crystalline zeolitic aluminosilicates are often referred to as molecular sieves. In the hydrated form, the aluminosilicate may be represented by the formula represented in Equation 1,

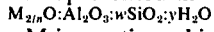

where M is a cation which balances the electrovalence of the tetrahedra, $n$ represents the valence of the cation, $w$, the moles of $SiO_2$ and $y$, the moles of water. The cation may be any one of a number of ions, such as for example, the alkali metal ions, the alkaline earth ions, or rare earth ions. The cations may be mono-, di-, or trivalent.

Crystalline aluminosilicates, which find use in the process of the invention possess relatively well-defined pore structures. The exact type aluminosilicates is generally defined by the silica/alumina ratio and the pore dimensions. The faujasites are commonly represented as type X and type Y aluminosilicates and are defined by their varying silica to alumina ratios.

The synthesized zeolite type X can be represented in terms of mole oxides as represented in the following Equation 2,

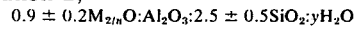

where M represents at least one cation having the valence of not more than 3, $n$ represents the valence of M, and $y$ is value up to about 8 depending on the identity of M and the degree of hydration of the crystal. Zeolite type X is described in U.S. Pat. No. 2,882,244.

The type Y zeolite may be represented in the terms of the mole ratio of oxides for the sodium form as represented in the following Equation 3,

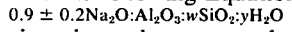

wherein $w$ is a value greater than 3 and up to about 6 and $y$ may be a value up to about 9. The type Y zeolite is described in U.S. Pat. No. 3,130,007.

The crystalline aluminosilicates for hydrogenation catalysts contain at least one metallic component selected from the Group VIII metals. These metallic components may be composited with the base or carrier (crystalline aluminosilicate) in amounts from about 0.1% to about 20% by weight of the catalyst. The metal component may be composited in manners similar to those explained for the amorphous aluminosilicate type catalyst. When the metallic components are composited on the crystalline aluminosilicate base or carrier, they are generally placed on the aluminosilicate by impregnation or base exchange means.

The process of the activation of a hydrogenation catalyst as expressed in this specification may be performed during the catalyst manufacture or in the hydrogenation reaction zone. In either situation, the method of activation of this invention is generally performed as follows. A suitable inert gas is first passed over the catalyst to remove any oxygen or other undesirable gases present. After a suitable low temperature inert gas purge, the catalyst is contacted with a stream of gaseous hydrogen which contains a suitable sulfur compound at temperatures within the range of from about 550°F. to about 800°F. A preferred sulfur-containing gaseous hydrogen stream consists of about 90 volume percent hydrogen and about 10 volume percent hydrogen sulfide. After essentially all of the hydrogenation metal components have been converted from an oxide to a sulfide state, the sulfided catalyst is purged with a hydrogen stream to eliminate gaseous sulfides. While passing a sulfur-free hydrogen stream over the catalyst the temperature of the catalyst is maintained at a temperature within the range of from about 800°F. to about 900°F. to perform what is referred to as hydrogen stripping. Hydrogen stripping is performed for a period of time ranging from about 1 hour to about 24 hours and preferably from about 2 to about 8 hours.

It is preferred in the reduction and sulfiding activation steps disclosed herein that the quantity of gaseous sulfur compounds present be passed over the catalyst in sufficient concentration to allow sulfiding of metallic components present in the catalyst in a reasonable length of time. Knowing the metal content present in the catalyst and a concentration of the sulfur compound passing over the catalyst at a given flow rate and assuming essentially complete conversion of the metal to sulfides, it is possible without much difficulty to calculate the time required for sulfiding. It is preferred to employ sulfur concentrations in excess of about 50 weight p.p.m. concentration based on the total mass of material passing over the catalyst.

The method of activation of a hydrogenation catalyst as disclosed herein can also be used for the catalyst employed in a hydrogenation process whose primary function is the desulfurization and denitrification of a hydrocarbon feed stream. This method is particularly attractive for application to those processes which hydrorefine black oils. Typical black oils are atmospheric tower bottoms products, vacuum tower bottoms products, crude oil residuum, topped crude oils, crude oils extracted from tar sands and oil shale, etc.

Petroleum crude oils, particularly the heavy oils extracted from tar sands, topped or reduced crudes, and vacuum residuum etc., contain high molecular weight sulfurous compounds in exceedingly large quantities. In addition, such crude, or black oils contain excessive quantities of nitrogenous compounds, high molecular weight organo-metallic complexes principally comprising nickel and vanadium, and asphaltic material. Currently, an abundant supply of such hydrocarbonaceous material exists, most of which has a gravity less than 20.0° API at 60°F., and a significant proportion of which has a gravity less than 10.0. This material is generally further characterized by a boiling range indicating that 10% or more, by volume boils above a temperature of about 1,050°F.

The gaseous hydrogen stream used in reducing, sulfiding and stripping of the hydrogenation catalyst should be relatively pure hydrogen gas. It is preferred that the gaseous hydrogen stream used in the process of this invention for the activation of the hydrogenation catalyst be at least greater than about 80 mol percent hydrogen. When hydrogen sulfide gas is used, the total gas purity including hydrogen and hydrogen sulfide should be above 80 mol percent. In some instances, it is possible to use refinery gas streams containing large amounts of hydrogen which generally can be taken from hydrogen producing units within the refinery, such as reformers and other basic dehydrogenation type processes. Small amounts of light hydrocarbons ($C_4$ and lighter gases) present in the gaseous stream passing into the hydrogenation catalyst during reduction, sulfiding and stripping operations do not appear to detrimentally affect resulting catalyst activity and selectivity. The maximum amount of light hydrocarbons allowable in the gaseous hydrogen stream is about 20 mol percent.

Complete reduction and sulfiding of the metallic component or components of the hydrogenation catalyst is generally determined by the presence of hydrogen sulfide in the effluent gas leaving the catalyst bed. The presence of unreacted sulfur compounds, such as hydrogen sulfide, is an indication that substantially all of the metallic components present in the hydrogenation catalyst in the catalyst bed, which are capable of being sulfided have been sulfided. After this sulfur breakthrough is recognized, the catalyst bed is swept with hydrogen to purge any residual gaseous sulfides. With a substantially pure hydrogen flow across the catalyst bed, the catalyst is stripped as hereinabove described.

The quantity that readily gives a basis for comparative catalyst evaluation when using the method of activation of this invention, is the average catalyst bed temperature. The average bed temperature is an indication of the activity of the catalyst since this temperature is adjusted to yield a desired residual sulfur concentration or a desired saturation level in the final product. Thus, a comparatively low catalyst bed temperature would be found for a catalyst of high activity. The invention and the benefits afforded therefrom are illustrated in the following examples which are not intended to be limiting in scope.

EXAMPLE I

Example I is used as a reference case to determine the benefit afforded by the use of the activation method of this invention and is representative of the start-up used in the prior art whereby the catalyst to be pretreated is contacted with a sulfurous hydrocarbon feed stock stream while circulating gaseous hydrogen through the catalyst at an elevated temperature and pressure. The pretreatment hydrocarbon feed stock used for this example was analyzed and is reported in Table I below.

TABLE I

| Pretreatment Distillate Properties | |
|---|---|
| Gravity, °API at 60°F. | 20.3 |
| Specific Gravity, at 60°F. | 0.9321 |
| Engler Distillation (°F.) | |
| 5% | 453 |
| 10% | 481 |
| 30% | 497 |
| 50% | 515 |
| 70% | 538 |
| 90% | 594 |
| 95% | 630 |
| E.P. | 660 |
| Total Sulfur, wt. % | 2.15 |
| Total N, p.p.m. | 159 |
| Aromatics, LV% | 65.5 |
| Olefins, LV% | 2.0 |
| Paraffins and naphthenes, LV% | 32.5 |

The catalyst used in the example and all of the following examples was an alumina base catalyst which contained approximately 2 wt. % cobalt and 12 wt. % molybdenum, calculated as if the metals existed in the elemental state. This catalyst was loaded into a catalyst testing plant and contacted with the above described pretreatment feed stock and hydrogen at a liquid hourly space velocity (LHSV) of 1, a temperature of 450°F., a pressure of 2,000 psig. and with a gas recirculation rate of 5,000 standard cubic feet of hydrogen per barrel (SCFB) for 24 hours. The catalyst testing unit which was used to evaluate the performance of the catalyst used in this example and in all subsequent examples, was essentially a single reaction zone type plant with a general flow scheme as described below. Fresh hydrocarbon feed was passed in admixture with a hydrogen rich gaseous stream into the catalytic reaction zone, which contained about 400 cc. of catalyst. The effluent from the reaction zone was passed to a high pressure separator wherein liquid and gaseous streams were separated. The gaseous stream comprised primarily hydrogen. The liquid from the high pressure separator was then passed into a stripper column. The stripper column separated gases having molecular weights of four carbon numbers or less from the liquid effluent passing out of the high pressure separator. The bottoms stream from the stripper column which comprises $C_5+$ hydrocarbons was considered the product.

After the above described pretreatment has been performed, the flow of pretreatment feed stock was discontinued and a reduced crude feed stock, described hereinbelow in Table II, was substituted therefor.

TABLE II

| Reduced Crude Properties | |
|---|---|
| Gravity, °API at 60°F. | 13.3 |
| Specific Gravity, at 60°F. | 0.9772 |
| Distillation (°F.) | |
| IBP | 613 |
| 5% | 651 |
| 10% | 689 |
| 30% | 812 |
| 50% | 976 |
| 60% | 1037 |
| % Over | 62 |
| Total Sulfur, wt. % | 3.85 |
| Total Nitrogen, wt. % | 0.41 |
| Conradson Carbon, wt. % | 11.7 |
| Heptane Insoluble, wt. % | 7.72 |

The reduced crude feed stock was processed over the pretreated catalyst at a pressure of 2,000 psig., a liquid hourly space velocity of 1.2, a hydrogen circulation rate of 5,000 SCF and the reaction zone temperature was raised to maintain a residual sulfur level of 1.0 wt. % in the product. The processing of the reduced crude at these operating conditions shall hereinafter be referred to as the standard activity test. The target residual sulfur level was maintained with a reaction zone temperature of 756°F. after 250 hours of processing reduced crude. The results of catalyst performance for this example and those subsequent are summarized in Table III.

EXAMPLE II

A second batch of catalyst was loaded into the catalyst testing plant and the catalyst was subjected to the standard activity test as hereinbefore described without pretreatment of any type. A temperature of 770°F. was required to reduce the product sulfur level to 1.0 wt. % after 250 hours on stream. An untreated catalyst demonstrates an extremely poor activity.

EXAMPLE III

A third batch of catalyst was loaded into the catalyst testing plant and was contacted with a hydrogen containing gas with a 90% hydrogen and 10% hydrogen sulfide composition, hereinafter referred to as the standard sulfiding gas, for a period of 4 hours at 70°F. The sulfided catalyst was then stripped with an essentially pure hydrogen stream for 3 hours at 775°F. After pretreatment, the catalyst was subjected to the standard activity test and the required temperature was 768°F. The sulfiding at ambient temperature was only marginally more effective than no pretreatment.

EXAMPLE IV

A fourth batch of catalyst was loaded into the catalyst testing plant and was contacted with a sulfiding gas which had the same composition as that in the previous example for 4 hours at 572°F. and then stripped with hydrogen for 3 hours at 775°F. The temperature required to maintain 1.0 wt. % product sulfur during the standard activity test was 752°F.

EXAMPLE V

A fifth batch of catalyst was loaded into the catalyst testing plant and was contacted with the standard sulfiding gas at 775°F. for 4 hours and then stripped with hydrogen for 3 hours at 775°F. A temperature of 747°F. was required to reduce the product sulfur level to 1.0 wt. % after 250 hours on stream.

EXAMPLE VI

A sixth batch of catalyst was subjected to sulfiding for 4 hours at 775°F. and then stripped with hydrogen for 3 hours at 600°F. The temperature required to maintain 1.0 wt. % product sulfur during the standard activity test was 755°F.

EXAMPLE VII

A seventh batch of catalyst was subjected to sulfiding for 4 hours at 775°F. and then stripped with hydrogen for 3 hours at 900°F. The temperature required to maintain 1.0 wt. % product sulfur during the standard activity test was 748°F.

EXAMPLE VIII

An eighth batch of catalyst was subjected to sulfiding for 4 hours at 775°F. and then stripped with hydrogen for 3 hours at 1100°F. The temperature required to maintain 1.0 wt. % product sulfur during the standard activity test was 775°F.

EXAMPLE IX

A ninth batch of catalyst was subjected to sulfiding for 4 hours at 850°F. and then stripped with hydrogen for 3 hours at 850°F. The temperature required to maintain 1.0 wt. % product sulfur during the standard activity test was 772°F.

EXAMPLE X

A tenth batch of catalyst was loaded into the catalyst plant and was contacted with the standard sulfiding gas as hereinbefore described at a temperature of 775°F. for 4 hours. Unlike the preceding eight examples, the sulfided catalyst was immediately subjected to the standard activity test without stripping and the required temperature was found to be 774°F.

TABLE III

| Ex. | Catalyst Pretreatment | | Reaction Zone Temperature Required To Yield 1% Sulfur After 250 Hours On Stream, °F. |
|---|---|---|---|
| | Presulfiding Temperature, °F. | Hydrogen Strip, °F. | |
| I | (Prior Art Pretreatment With Hydrocarbon Distillate) | | 756 |
| II | (No Pretreatment) | | 770 |
| III | 70 | 775 | 768 |
| IV | 572 | 775 | 752 |
| V | 775 | 775 | 747 |
| IV | 775 | 600 | 755 |
| VII | 775 | 900 | 748 |
| VIII | 775 | 1100 | 775 |
| IX | 850 | 850 | 772 |
| X | 775 | (no stripping) | 774 |

The pretreatment performed in Example V produced the most active catalyst for the desulfurization of reduced crude. The catalyst prepared according to Examples IV, V, VI and VII was more active than that produced with the prior art pretreatment with hydrocarbon distillate. According to Example II an untreated catalyst is grossly inferior to catalysts which have been pretreated by any method. Example X demonstrates the criticality of hydrogen stripping in a successful pretreatment of a catalyst in which a gaseous hydrogen and a sulfur compound are utilized.

I claim as my invention:

1. In a method for the activation of a mass of a hydrogenation catalyst containing cobalt and molybdenum components present in an oxidized form, the steps of:
   a. intimately contacting said mass of catalyst with gaseous hydrogen, containing a sulfur compound, at a temperature within the range of from about 550°F. to about 800°F. for a sufficient time to effect the reduction and sulfiding of a major proportion of said metallic components; and,
   b. stripping the resulting reduced and sulfided catalyst with substantially pure hydrogen at a temperature within the range of from about 750°F. to about 900°F.

2. The process of claim 1 further characterized in that said hydrogenation catalyst is an amorphous alumina carrier material containing said cobalt and molybdenum components.

3. The process of claim 1 further characterized in that said sulfur compound is hydrogen sulfide.

* * * * *